US010772055B2

(12) United States Patent
Da et al.

(10) Patent No.: US 10,772,055 B2
(45) Date of Patent: Sep. 8, 2020

(54) BASE STATION SYNCHRONIZATION (71) Applicant: Alcatel-Lucent USA Inc., Murray Hill, NJ (US)

(72) Inventors: Ren Da, Warren, NJ (US); Fang-Chen Cheng, Randolph, NJ (US)

(73) Assignee: Alcatel Lucent, Murray Hill, NJ (US)

( * ) Notice: Subject to any disclaimer, the term of this patent is extended or adjusted under 35 U.S.C. 154(b) by 1069 days.

(21) Appl. No.: 14/681,963

(22) Filed: Apr. 8, 2015

(65) Prior Publication Data

US 2016/0302165 A1 Oct. 13, 2016

(51) Int. Cl.
*H04W 56/00* (2009.01)

(52) U.S. Cl.
CPC ....... *H04W 56/001* (2013.01); *H04W 56/002* (2013.01)

(58) Field of Classification Search
CPC ... H04W 28/16; H04W 56/00; H04W 56/001; H04W 72/00; H04W 56/0005; H04W 56/0015
See application file for complete search history.

(56) References Cited

U.S. PATENT DOCUMENTS

| 6,643,517 | B1* | 11/2003 | Steer | H04W 48/04 |
| | | | | 455/456.4 |
| 6,847,826 | B1 | 1/2005 | Wesby | |
| 8,620,333 | B2* | 12/2013 | Gormley | H04W 28/16 |
| | | | | 455/450 |
| 9,002,354 | B2 | 4/2015 | Krishnamurthy et al. | |
| 2007/0230510 | A1* | 10/2007 | You | H04B 7/269 |
| | | | | 370/503 |
| 2010/0157975 | A1 | 6/2010 | In et al. | |
| 2010/0216481 | A1 | 8/2010 | Gormley | |
| 2010/0317343 | A1* | 12/2010 | Krishnamurthy | G01S 1/30 |
| | | | | 455/435.1 |
| 2011/0319100 | A1 | 12/2011 | Flanagan | |

(Continued)

FOREIGN PATENT DOCUMENTS

| CN | 101467365 A | 6/2009 |
| CN | 101478341 | 7/2009 |

(Continued)

OTHER PUBLICATIONS

"Technical Specification Group Radio Access Network; Evolved Universal Terrestrial Radio Access (E-UTRA); Requirements for Support of Radio Resource Management (Release 12)", 3GPP TS 36.133, Sections 7.4 and 7.5, Mar. 2015, 2 pages.

(Continued)

*Primary Examiner* — Jung H Park (57) ABSTRACT

A first base station synchronizes with one or more second base stations by transmitting, from the first base station, a first timing reference signal and receiving, at the first base station, one or more second timing reference signals transmitted by the one or more second base stations. The method also includes determining one or more first timing offsets between the first base station and the one or more second base stations based on the one or more second timing reference signals. The method further includes adjusting a timing associated with the first base station based on the one or more first timing offsets and one or more second timing offsets determined based on the first timing reference signal.

20 Claims, 5 Drawing Sheets

(56) References Cited

U.S. PATENT DOCUMENTS

| | | |
|---|---|---|
| 2012/0201218 A1 | 8/2012 | Yamamoto |
| 2014/0092894 A1 | 4/2014 | Rossetti |
| 2014/0204828 A1 | 7/2014 | Connors et al. |
| 2014/0211779 A1 | 7/2014 | Caire et al. |
| 2015/0163760 A1* | 6/2015 | Wu .................. H04W 56/0015 370/336 |
| 2017/0280415 A1* | 9/2017 | Kim .......................... G01S 5/02 |

FOREIGN PATENT DOCUMENTS

| | | |
|---|---|---|
| CN | 102474838 | 5/2012 |
| CN | 102948230 | 2/2013 |
| CN | 103250451 | 8/2013 |
| CN | 103875198 A | 6/2014 |
| EP | 2574122 | 3/2013 |
| JP | 2011082800 | 4/2011 |
| JP | 2011082800 A | 4/2011 |
| KR | 20100070619 A | 6/2010 |
| WO | 2010144765 A1 | 12/2010 |
| WO | 2011146180 A1 | 11/2011 |
| WO | 2012073842 A1 | 6/2012 |
| WO | 2014029112 A1 | 2/2014 |

OTHER PUBLICATIONS

"Technical Specification Group Radio Access Network; Evolved Universal Terrestrial Radio Access Network (E-UTRAN); Stage 2 Functional Specification of User Equipment (UE) Positioning in E-UTRAN (Release 12)", 3GPP TS 36.305, Sections 8.4 and 8.5, Dec. 2014, 6 pages.

"Technical Specification Group Radio Access Network; Evolved Universal Terrestrial Radio Access Network (E-UTRAN); S1 Application Protocol (S1AP) (Release 12)", 3GPP TS 36.413, Sections 5, 6, and 7, Mar. 2015, 4 pages.

"Technical Specification Group Radio Access Network; Small Cell Enhancements for E-UTRA and E-UTRAN—Physical Layer Aspects (Release 12)", 3GPP TS 36.872, Section 6.3, Dec. 2013, 11 pages.

"Technical Specification Group Radio Access Network; Evolved Universal Terrestrial Radio Access (E-UTRA); LTE Positioning Protocol (LPP) (Release 12)", 3GPP TS 36.355, Section 6.5.1, Mar. 2015, 10 pages.

"Technical Specification Group Radio Access Network; Evolved Universal Terrestrial Radio Access (E-UTRA); LTE Positioning Protocol A (LPPa) (Release 12)" 3GPP TS 36.455, Sections 8.2.5 and 8.2.6, Mar. 2015, 3 pages.

"Technical Specification Group Radio Access Network; Evolved Universal Terrestrial Radio Access Network (E-UTRAN); X2 Application Protocol (X2AP) (Release 12)", 3GPP TS 36.423, Sections 5, 6, 7, Mar. 2015, 3 pages.

"Timing and Synchronization for LTE-TDD and LTE-Advanced Mobile Networks", Symmetricom, White Paper, Aug. 3, 2013, 9 pages.

"IEEE Standard for a Precision Clock Synchronization Protocol for Networked Measurement and Control Systems", IEEE Instrumentation and Measurement Society, IEEE Std 1588-2008, Section 6, Jul. 24, 2008, 25 pages.

David Bladsjo et al., "Synchronization Aspects in LTE Small Cells", IEEE Communications Magazine, Sep. 2013, 8 pages.

"Third Further Notice of Proposed Rulemaking", Federal Communications Commission, FCC 14-13, Section I, Feb. 21, 2014, 3 pages.

"Notice of Proposed Rulemaking, Third Report and Order, and Second Further Notice of Proposed Rulemaking", Federal Communications Commission, FCC 11-107, Section II, Jul. 13, 2011, 5 pages.

International Search Report and Written Opinion correlating to PCT/US2016/026810 dated Jun. 24, 2016, 12 pages.

Translation of Notice of Preliminary Rejection dated Nov. 14, 2018 for Korean Application No. 10-2017-7031969, 5 pages.

Japanese Office Action dated May 5, 2019 for Japanese Patent Application No. 2017-552834, 8 pages.

Korean Office Action dated May 28, 2019 for Korean Patent Application No. 10-2017-7031969, 5 pages.

Korean Office Action dated Jul. 26, 2019 for Korean Patent Application No. 10-2017-7031969, 7 pages.

Office Action dated Jan. 30, 2020 for Japanese Patent Application No. 2017-552834, 3 pages.

Second Office Action dated May 13, 2020 in Chinese Patent Application No. 201680018590.8, 11 pages.

\* cited by examiner

BASE STATION SYNCHRONIZATION

BACKGROUND

Field of the Disclosure

The present disclosure relates generally to wireless communication systems and, more particularly, to synchronization of base stations in wireless communication systems.

Description of the Related Art

Wireless communication systems include base stations for providing wireless coverage within corresponding cells. The base stations may also be referred to as eNodeBs, base station routers, and the like. As used herein, the term base station may also refer to small cells such as access points, home base station routers, metrocells, microcells, femtocells, picocells, and the like. User equipment in the wireless communication system may be located using signals transmitted by the base stations. For example, the Observed Time Difference Of Arrival (OTDOA) technique uses the difference in arrival times of position reference signals (PRSs) transmitted by multiple base stations to a user equipment to estimate the location of the user equipment by multilateration. Base stations can transmit the PRS in one of a standardized set of configurations that are defined by the cell specific subframe configuration period, the cell specific subframe offset for PRS transmission, and the number of consecutive PRS downlink subframes. Base stations may also be configured with PRS muting patterns. When one base station transmits PRS, the corresponding PRS resources for the neighboring base station are muted to reduce the interference to the PRS, so that the user equipment can listen to the transmitted PRS with reduced interference. The configurations of the PRS may be different for different base stations and particular configurations are conveyed to user equipment when OTDOA measurements are requested. For another example, in the Uplink Time Difference Of Arrival (UTDOA) technique user equipment transmit sounding reference signals (SRSs) to the base stations and the location of the user equipment is calculated using differences in arrival times of the SRSs received by the base stations.

The accuracy of OTDOA or UTDOA position determinations depends on the degree of synchronization between the timing references used by the different base stations. Consequently, base stations that implement OTDOA or UTDOA must satisfy stringent timing constraints on phase synchronization, delay measurements, and delay compensation. For example, U.S. Federal Communication Commission (FCC) requirements for the E911 service specify that an emergency caller's location be determined within an accuracy of at least 50 meter (m) for 67% of calls and an accuracy of at least 150 m for 90% of calls. To achieve the FCC-mandated accuracy, transmission times of downlink radio frames from antenna tips at different base stations should normally be synchronized within 100 nanosecond (ns) accuracy.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for base station synchronization. The method includes transmitting, from a first base station, a first timing reference signal and receiving, at the first base station, one or more second timing reference signals transmitted by one or more second base stations. The method also includes determining one or more first timing offsets between the first base station and the one or more second base stations based on the one or more second timing reference signals. The method further includes adjusting a timing associated with the first base station based on the one or more first timing offsets and one or more second timing offsets determined based on the first timing reference signal.

In some embodiments, a first base station is provided for synchronization with one or more second base stations. The first base station includes a transceiver to transmit a first timing reference signal and receive one or more second timing reference signals transmitted by one or more second base stations. The first base station also includes a processor to determine one or more first timing offsets between the first base station and the one or more second base stations based on the one or more second timing reference signals. The processor also is to adjust a timing associated with the first base station based on the one or more first timing offsets and one or more second timing offsets determined based on the first timing reference signal.

In some embodiments, an apparatus is provided to support base station synchronization. The apparatus includes a transceiver to receive two or more timing offsets determined by two or more base stations based on timing reference signals exchanged by the base stations. The apparatus also includes a processor to determine a timing adjustment associated with the base stations based on the timing offsets.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Base stations within a macrocellular network may synchronize to an external timing reference such as a Global Navigation Satellite System (GNSS) timing reference, including Global Positioning System (GPS), so that the boundaries between transmission time intervals (TTIs) associated with corresponding system frame numbers (SFNs) for the different base stations are synchronized to within 100 ns accuracy. However, GNSS timing reference signals are not available to base stations that are deployed indoors or are otherwise unable to see the necessary number of satellites. Furthermore, GNSS synchronization may require retrofitting base stations with GNSS antennas and receivers, which may be a complex operation and incur large capital expenditures.

Base stations may also be synchronized based on a network timing protocol, such as IEEE 1588 Precision Time Protocol (PTP), which employs a client/server architecture to maintain synchronization across all network components. In IEEE 1588 synchronization, a PTP server serves as a reference source that provides time-stamped packets over wired connections through the network to PTP clients implemented in the base stations. The PTP clients can then synchronize to the PTP server timing reference by comparing their local time references to the timestamps in the received packets. However, hardware, firmware, and software in the backhaul network must be upgraded to support PTP-based synchronization, which may be a complex operation that incurs large capital expenditures. In addition, the accuracy of the PTP based approach is limited by packet delay variations and network path asymmetry, which makes it difficult or impossible to meet the stringent timing requirements of OTDOA and UTDOA.

Network listening may also be used to synchronize base stations using signals transmitted over an air interface between the base stations. In network listening, one base station is designated as a target base station that "listens" to a reference signal (RS) transmitted by another (source) base station. The target base station uses the RS to synchronize to the timing reference used by the source base station. However, a number of factors limit the accuracy of the synchronization that can be achieved by network listening.

The factors that limit the accuracy of the synchronization include:
1. Channel condition of received network listening RS at the target cell.
2. The RS being used for synchronization may have different processing gains and experience different levels of interference.
3. Propagation delay between source cell and target cell.
4. Time drift between the network listening slots caused by drifting of a local oscillator.
5. Synchronization status of the original synchronization sources.
6. Source cell selection mechanism.

These factors limit the base station synchronization accuracy of network listening to approximately 3 microseconds (µs), which is at least an order of magnitude too large to meet the OTDOA and UTDOA requirements.

Base stations can be synchronized within a few ns of the 100 ns required for OTDOA and UTDOA position location techniques by combining redundant measurements of a timing offset between each base station and one or more neighboring base stations. Each base station transmits a reference signal and receives reference signals from one or more neighboring base stations. Each base station can then determine one or more timing offsets between itself and the one or more neighboring base stations based on the received reference signals. Neighboring base stations may also determine redundant values of the corresponding timing offsets using the transmitted reference signals. The timing offsets determined by the base station and the neighboring base stations may then be combined to determine optimal timing offsets for the base stations. For example, the reference signals may be transmitted at a predetermined time (measured at the transmitting base station) or they may include a timestamp that indicates the transmission time at the transmitting base station. The receiving base station compares the transmission time of the reference signals to the receiving base station's local time to determine the timing offsets.

Propagation delays between different base stations may be comparable to the propagation delays between the base stations and user equipment. Including the propagation delays in the timing offset measurements may therefore introduce errors comparable to the propagation delays used to determine positions of the user equipment. Thus, the inter-base station propagation delays should be computed and removed from the timing offsets. In some embodiments, base station locations can be used to estimate the propagation delays, either by exchanging locations between the base stations or using locations stored in a central server or common data processor. Propagation delays between two base stations may also be removed from the timing offsets by subtracting the redundant timing offsets from each other or using measurements of round-trip delays between the base stations, as discussed herein.

Figure 1:
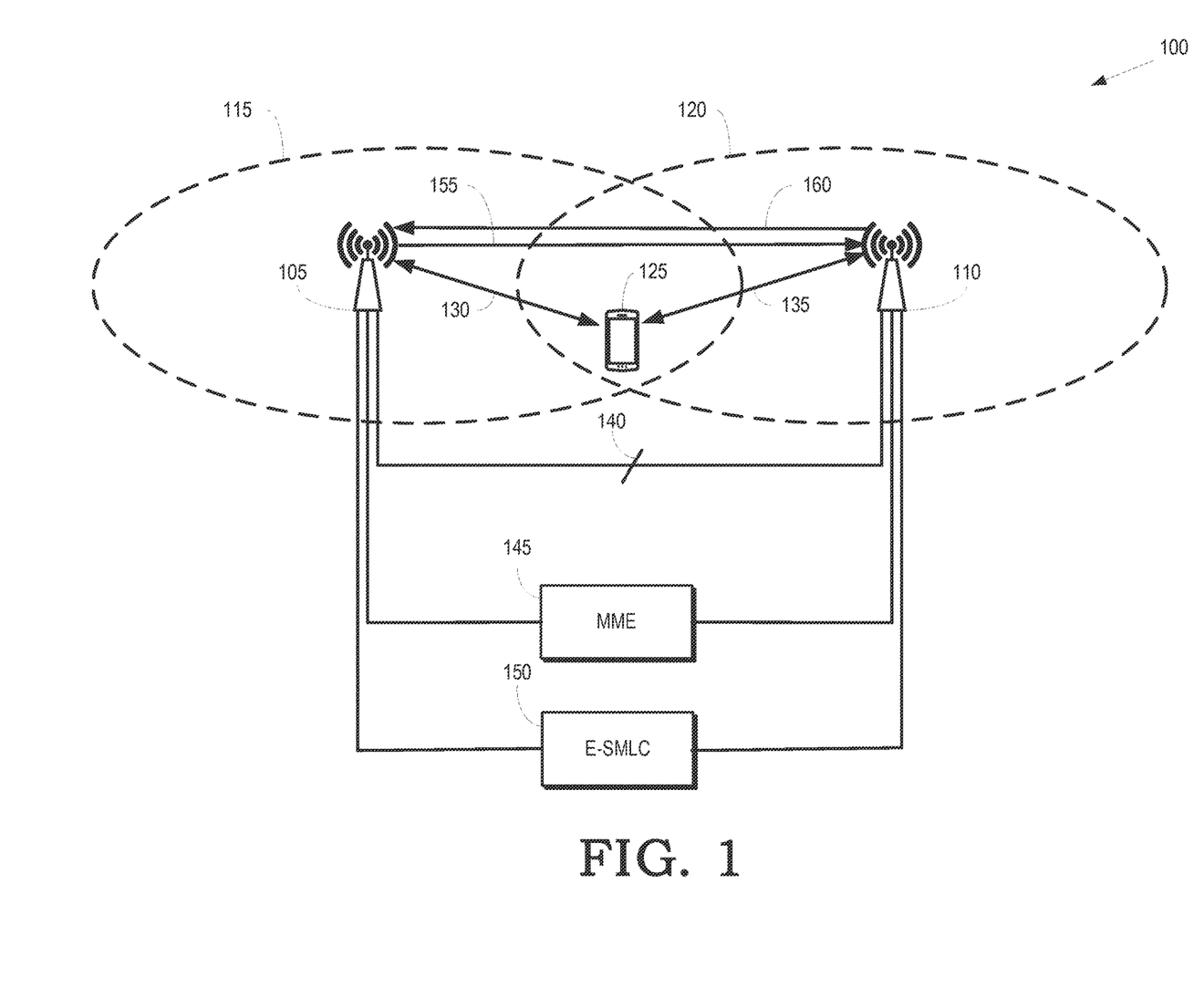
FIG. 1 is a block diagram of a wireless communication system according to some embodiments.

FIG. 1 is a block diagram of a wireless communication system 100 according to some embodiments. The wireless communication system 100 includes base stations 105, 110 that are used to provide wireless connectivity to corresponding geographic areas or cells 115, 120. Some embodiments of the base stations 105, 110 may be a portion of an Evolved Universal Terrestrial Radio Access Network (E-UTRAN) that provides wireless connectivity according to standards defined by the Third Generation Partnership Project (3GPP) Long Term Evolution (LTE). For example, the base stations 105, 110 may implement orthogonal frequency division multiple access (OFDMA) to support downlink communication and single carrier-frequency division multiple access (SC-FDMA) to support uplink communication. However, some embodiments of the wireless communication system 100 may operate according to other standards or protocols including code division multiple access (CDMA), Global System for Mobile communication (GSM), IEEE 802.11, and the like.

The base stations 105, 110 provide wireless connectivity to one or more user equipment 125 located within one or more of the cells 115, 120. For example, the base stations 105, 110 and the user equipment 125 can exchange data or signaling information over uplink or downlink channels of the air interfaces 130, 135. An interface 140 may be used to exchange data or signaling information between the base stations 105, 110. For example, the interface 140 may operate according to the X2 application protocol (X2-AP) and may be used to convey signaling related to mobility management, load management, error reporting, and the like. The messages conveyed over the interface 140 may include handover preparation messages, handover requests, reset messages, configuration updates, modifications to mobility settings, and the like.

A mobility management entity (MME) 145 is coupled to the base stations 105, 110. Some embodiments of the MME 145 are responsible for paging the user equipment 125 when the user equipment 125 is in the idle mode, e.g., by sending paging messages via the base stations 105, 110. The MME 145 may also be responsible for choosing gateways at initial attachment of the user equipment 125. The MME 145 may terminate non-access stratum (NAS) signaling and be responsible for the generation and allocation of temporary identities to the user equipment 125. The MME 145 may also be the termination point for ciphering/integrity protection and handle security key management.

A serving mobile location center (SMLC) or an enhanced SMLC (e-SMLC) 150 may be used to calculate the location of the user equipment 125 using information provided by the base stations 105, 110.

Some embodiments of the e-SMLC 150 determine the location of the user equipment 125 using OTDOA techniques. For example, the base stations 105, 110 may transmit OTDOA configuration parameters including configuration information for positioning reference signals (PRSs) to the e-SMLC 150 according to the LTE positioning protocol A (LPPa). The base stations 105, 110 may then broadcast the PRSs over the air interfaces 130, 135 in the configured time slots and frequencies. The e-SMLC 150 provides the user equipment 125 with the PRS configuration information using the LTE positioning protocol (LPP) so that the user equipment 125 is able to detect and measure the PRS signals broadcast by the base stations 105, 110. The user equipment 125 measures and reports the OTDOA for the PRSs back to the e-SMLC 150. If the base stations 105, 110 are perfectly time synchronized, the reported OTDOA measurements are equal to the signal propagation time differences from the base stations 105, 110 to the user equipment 125 plus any measurement errors. The e-SMLC 150 can then use the reported OTDOA measurements and the known locations of the base stations 105, 110 to determine the locations of the user equipment 125.

Some embodiments of the e-SMLC 150 determine the location of the user equipment 125 using UTDOA techniques. For example, the user equipment 125 may transmit sounding reference signals (SRS) according to SRS configuration information provided to the user equipment 125 by the serving base station. The serving and neighboring base stations 105, 110 measure the received SRS to obtain UTDOA measurements. If the base stations 105, 110 are perfectly time synchronized, the measured UTDOA is equivalent to the signal propagation times from the user equipment 125 to the corresponding base stations 105, 110 plus a timing offset of the user equipment 125 and any measurement errors. The base stations 105, 110 transmit the UTDOA measurements to the e-SMLC 150 via LPPa. The e-SMLC 150 can remove the timing offset associated with the user equipment 125 by subtracting the UTDOA measurements from the pair of base stations 105, 110 to obtain the signal propagation time differences from the base stations 105, 110 to the user equipment 125. The e-SMLC 150 may then use the signal propagation time differences and known locations of the base stations 105, 110 to determine the location of the user equipment 125.

The accuracy of the OTDOA and UTDOA techniques is therefore dependent upon the degree of synchronization of the base stations 105, 110, which is determined by the required positional accuracy. A signal propagating over the air interfaces 130, 135 takes approximately 1 μs to travel 300 m. Thus, the base stations 105, 110 are required to be synchronized at least to within less than 166 ns in order to support the FCC E-911 requirements for 50 m positioning accuracy.

Some embodiments of the base stations 105, 110 implement a two-way synchronization protocol in order to meet the stringent timing requirements for position location. For example, the base station 105 can transmit a timing reference signal 155 towards the base station 110, which uses the received timing reference signal 155 to determine first value of a timing offset between the base stations 105, 110. The base station 110 may also transmit a second timing reference signal 160 towards the base station 105, which uses the received timing reference signal 160 to determine a second value of the timing offset between the base stations 105, 110. The first and second values of the timing offset may then be combined (e.g., by averaging, filtering, or other statistical processes) to determine the timing offset between the base stations 105, 110. Combining multiple redundant timing offsets mitigates the timing synchronization accuracy limitations associated with one-way network listening approaches implemented by source and target base stations.

Propagation delays can be removed from the timing offsets determined based on the timing reference signals 155, 160 using location information, timing information, or round-trip delays. For example, if the base stations 105, 110 are located at locations D1 and D2, the propagation delay between the base stations 105, 110 is equal to the distance between D1 and D2 divided by the speed of light. Some embodiments of the base stations 105, 110 may therefore exchange location information or transmit their location information to the MME 145 or e-SMLC 150 so that this information can be used to compute the propagation delay. For another example, the propagation delays may be calculated directly from the timing offsets calculated by the base stations 105, 110. The timing offset measured by the base station 105 is TO1=D+dT and the timing offset measured by the base station 110 is TO2=D−dT, where D represents the signal propagation delay and dT represents the intrinsic timing offset between the base stations 105, 110. Thus, the signal propagation delay D can be removed by the subtracting the timing offsets measured at the base stations 105, 110. For yet another example, the base station 105 transmit a time-stamped reference signal 155 to the base station 110, which may respond by transmitting a time-stamped reference signal back 160 to the base station 105 after a predetermined time interval such as 10 ms. The base station 105 may then determine the round-trip propagation delay by comparing the transmission time of its reference signal 155 to the reception time of the reference signal 160 received from the base station 110. The propagation delay is half the round-trip propagation delay minus the predetermined time interval.

The base stations 105, 110 are configured for the two-way exchange of timing reference signals using information provided by the wireless communication system 100. In some embodiments, the MME 145 provides the configuration information to the base stations 105, 110. The configuration information is used to configure the base station 105 to send the timing reference signal 155 and to configure the base station 110 to send the timing reference signal 160. Configuration information may include information indicating the cell specific subframe configuration period used to transmit the timing reference signals 155, 160, the cell specific subframe offset for transmission of the timing reference signals 155, 160, and the number of consecutive downlink subframes that include the timing reference signals 155, 160. However, in some embodiments, other entities in the wireless communication system 100, such as the e-SMLC 150, may provide the configuration information to the base stations 105, 110.

The base stations 105, 110 transmit the measured timing offsets to a single location so that the timing offsets can be combined to generate the improved estimate of the timing offset between the base stations 105, 110. Some embodiments of the base station 110 transmit the value of the timing offset determined using the timing reference signal 155 back to the base station 105 so that the base station 105 can combine the timing offsets calculated by both base stations 105, 110. Information indicating the timing offset may therefore be transmitted over the interface 140 between the base stations 105, 110. The values of the timing offsets determined by the base stations 105, 110 may alternatively be combined at another entity, such as the MME 145 or the e-SMLC 150. For example, the base stations 105, 110 may provide the values of the timing offset determined using the timing reference signals 155, 160 to the MME 145 or the e-SMLC 150, which may combine the timing offsets and provide the estimated timing offset to one or more of the base stations 105, 110 for timing adjustment and synchronization.

The base stations 105, 110 use the determined timing offset to adjust or correct other timing information. For example, the base stations 105, 110 may use the determined timing offset to correct timing information used to determine propagation delays between the base stations 105, 110 and the user equipment 125. The corrections may be applied prior to performing position location determinations based on the measured propagation delays. For another example, the base stations 105, 110 may use the determined timing offset to adjust their internal timing, e.g., by adjusting internal clocks by an amount equal to the timing offset, so the timing references in the base stations 105, 110 are synchronized to each other.

Figure 2:
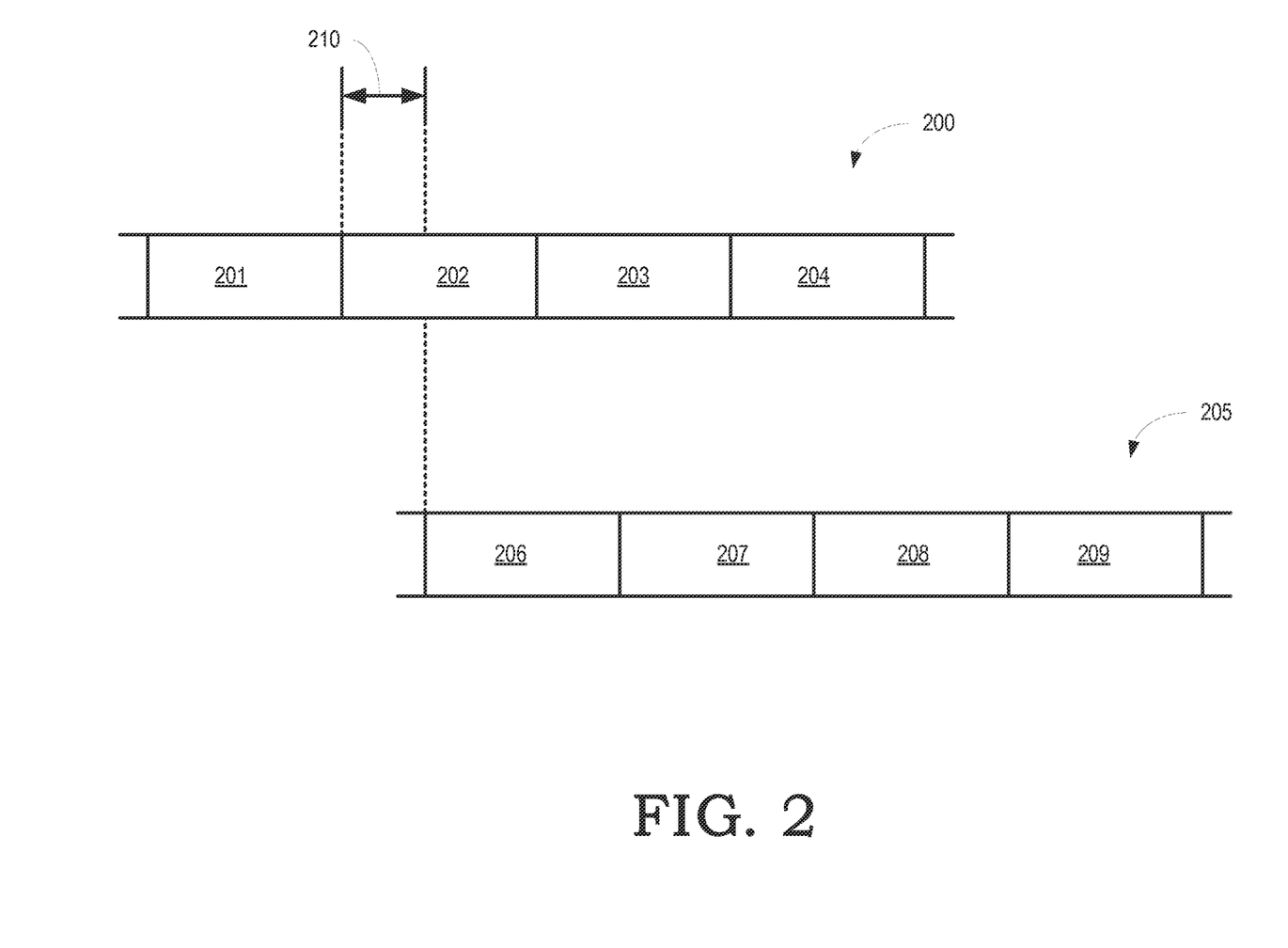
FIG. 2 is a diagram of frame structures for received and transmitted base station signals according to some embodiments.

FIG. 2 is a diagram of frame structures 200, 205 for received and transmitted base station signals according to some embodiments. The frame structures 200, 205 divided into subframes 201, 202, 203, 204 and subframes 206, 207, 208, 209, respectively, which may be referred to as "the subframes 201-204" and "the subframes 206-209." The subframes 201-204, 206-209 may also be referred to as TTIs. The frame structure 200 is used for the transmission of signals from a base station such as the base station 105 shown in FIG. 1 and the frame structure 205 represents the subframes 206-209 received at the base station from another base station, such as the base station 110 shown in FIG. 1. Corresponding subframes 201-204 and 206-209 may be indicated by the same subframe numbers, e.g., the subframes 201, 206 may be identified by the same subframe number. The subframe numbers may also be referred to as SFNs.

The receiving base station can measure a timing offset 210 between the transmitted and received signals using the timing reference signals transmitted in the subframes 201-204, 206-209. The timing offset is the time difference between the reception subframe boundaries in the frame structure 205 received from the other base station and the transmission subframe boundaries of the corresponding subframes in the frame structure 200. For example, the timing offset 210 is the time difference between the reception subframe boundary of the subframe 206 that includes the timing reference signal transmitted by the other base station and the transmission subframe boundary of the corresponding subframe 202. If the base stations are perfectly synchronized, the timing offset 210 is equal to a propagation delay between the base stations.

Figure 3:
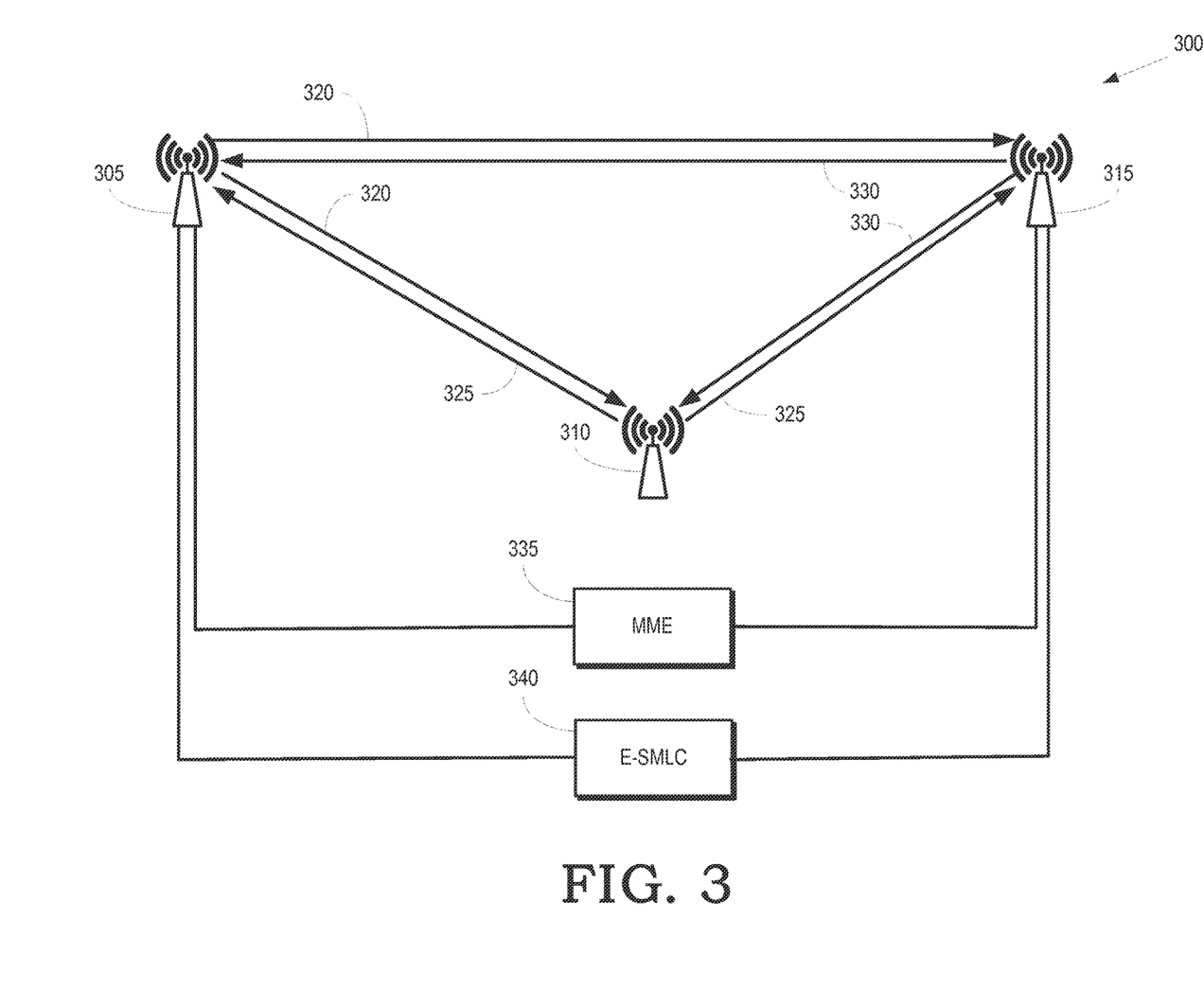
FIG. 3 is a block diagram of a wireless communication system according to some embodiments.

FIG. 3 is a block diagram of a wireless communication system 300 according to some embodiments. The wireless communication system 300 includes base stations 305, 310, 315 that are used to provide wireless connectivity to user equipment (not shown) in corresponding geographic areas or cells. Some embodiments of the base stations 305, 310, 315 may be a portion of an E-UTRAN that provides wireless connectivity according to standards defined by the 3GPP-LTE. For example, the base stations 305, 310, 315 may implement OFDMA to support downlink communication and SC-FDMA to support uplink communication. However, some embodiments of the wireless communication system 300 may operate according to other standards or protocols including CDMA, GSM, IEEE 802, and the like.

The base stations 305, 310, 315 can mutually synchronize to each other by broadcasting timing reference signals and monitoring the timing reference signals transmitted by the other base station 305, 310, 315. For example, the base station 305 may broadcast the timing reference signal 320, the base station 310 may broadcast the timing reference signal 325, and the base station 315 may broadcast the timing reference signal 330. The base stations 305, 310, 315 can also receive timing reference signals from any base stations that are within a reception range, which may be determined by a transmission power, beamforming of the transmitted signal, fading of the signal caused by the environment, and the like. Although pairs of the base stations 305, 310, 315 are depicted as receiving the timing reference signals 320, 325, 330 transmitted by the other base station 305, 310, 315 in the pair, this may not be the case in some embodiments. For example, the base station 305 may be within range and able to receive the timing reference signal 325, but the base station 310 may not be within range and may be unable to receive the timing reference signal 320.

The base stations 305, 310, 315 may use the timing reference signals 320, 325, 330 to determine timing offsets (including corrections for propagation delays) between the base stations 305, 310, 315, as discussed herein. The base stations 305, 310, 315 can transmit information indicating the timing offsets to a common data processing location for determining an improved estimate of the timing offset for each of the base stations 305, 310, 315. In some embodiments, the timing information is transmitted to an MME 335, which may combine the timing offsets and provide an improved estimate of the timing offset to one or more of the base stations 305, 310, 315 for timing adjustment and synchronization. For example, the MME 335 may receive redundant measurements of the timing offsets between pairs of base stations such as the base stations 305, 310, the base stations 310, 315, and the base stations 305, 315. The MME 335 can then form a statistical combination of the provided timing offsets to estimate an optimal set of timing adjustments for synchronizing the base stations 305, 310, 315. The timing adjustments may then be provided to the corresponding base station 305, 310, 315, which may use the timing adjustment to modify its timing.

In some embodiments, the timing information is transmitted to an e-SMLC 340, which may combine the timing offsets and provide the improved estimate of the timing offset to one or more of the base stations 305, 310, 315 for timing adjustment or synchronization. The e-SMLC 340 may also store location information for the base stations 305, 310, 315, which may facilitate estimating and correcting for propagation delays between the base stations 305, 310, 315, as discussed herein. The e-SMLC 340 may use the timing adjustments to calibrate location determination algorithms, e.g., the OTDOA or UTDOA algorithms that are used to determine locations of user equipment. The timing adjustments may also be provided to the corresponding base station 305, 310, 315, which may use the timing adjustment to modify its timing.

Some embodiments of the wireless communication system 300 may be advantageous relative to the embodiment of the wireless communication system 100 shown in FIG. 1. Adding additional redundant measurements of the timing offsets performed by multiple cells may be more effective in mitigating errors caused by varying channel conditions, radiofrequency interference, time drifts caused by frequency synchronization errors, and the like. Line-of-sight propagation delays between the base stations 305, 310, 315 may be removed by comparing the timing offsets computed by the different base stations 305, 310, 315, as discussed herein. There is also no need to have any mechanism for selecting a source cell or a target cell because each base station 305, 310, 315 is configured to measure the timing offsets from all detectable neighboring base stations. Errors caused by an unknown number of hops may also be reduced because the base station 305, 310, 315 report measurements from all detectable cells and a minimum number of hops is inherently implied by the optimal estimation result after processing of all of the measured timing offsets. Furthermore, there is no need to define an original synchronization source because the base station 305, 310, 315 are mutually synchronized to each other.

Figure 4:
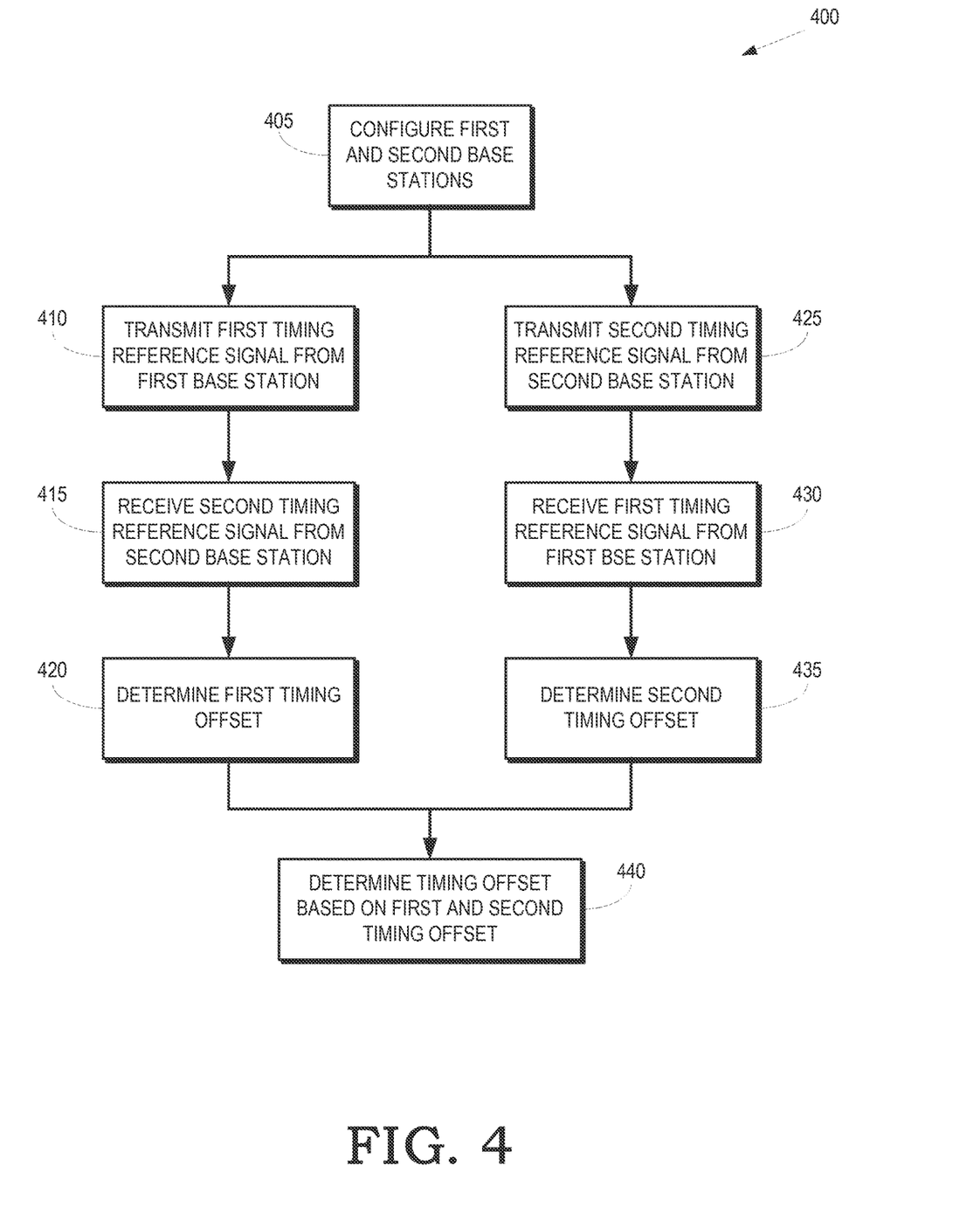
FIG. 4 is a flow diagram of a method for synchronizing base stations based on timing reference signals exchanged between the base stations according to some embodiments.

FIG. 4 is a flow diagram of a method 400 for synchronizing base stations based on timing reference signals exchanged between the base stations according to some embodiments. The method 400 may be implemented in some embodiments of the wireless communication system 100 shown in FIG. 1. Although the method 400 is described in the context of two base stations exchanging timing reference signals, some embodiments of the method 400 may be used to determine timing adjustments for more than two base stations based on timing reference signals transmitted between the base stations. The method 400 may therefore be implemented in some embodiments of the wireless communication system 300 shown in FIG. 3.

At block 405, the first and second base stations are configured to exchange timing reference signals. For example, an MME may provide configuration information indicating the air interface resources that are to be used for transmission of the timing reference signals by the first and second base stations. The first and second base stations may then be configured to transmit timing reference signals using the configured resources and to monitor the configured resources for timing reference signals transmitted by other base stations. The first and second base stations are also configured to determine timing offsets based on the received timing reference signals, as discussed herein. Configuration information may be conveyed to the base stations using existing messages (such as S1-AP messages transmitted by an MME) or new messages or information elements may be defined to convey the configuration information. The configuration information may include signal periods, muting patterns indicating when a monitoring base station is to mute transmission, and the like. In some embodiments, detection thresholds for the timing reference signals may be defined in the configuration information so that base stations only attempt to use the information in timing reference signals that have signal strengths (or other indications of signal quality) exceeding the detection threshold.

At 410, the first base station transmits the first timing reference signal using the configured resources. At 415, the first base station receives the second timing reference signal that was transmitted by the second base station. At 420, the first base station determines the first timing offset based on the received second timing reference signal, as discussed herein. At 425, the second base station transmits the second timing reference signal using the configured resources. At 430, the second base station receives the first timing reference signal that was transmitted by the first base station. At 435, the second base station determines the second timing offset based on the received first timing reference signal, as discussed herein. In some embodiments, the steps 410, 415, 420, 425, 430, 435 are performed concurrently. However, the steps 410, 415, 420, 425, 430, 435 may be performed in any order. Furthermore, in embodiments that include more than two base stations, additional steps for transmitting or receiving timing reference signals, as well as calculating the corresponding timing offsets, may be included in the method 400.

The first and second timing offsets are then used to determine a timing offset between the first and second base stations at block 440. In embodiments of the method 400 that determine timing adjustments using timing reference signals transmitted between a pair of base stations, the timing offsets may be provided to one of the base stations. For example, the second base station may provide the second timing offset to the first base station. Location information for the base stations may also be used to determine the timing offset in some embodiments, as discussed herein. For example, the second base station may provide information indicating its location to the first base station. The information indicating the timing offsets and location information (if provided) can be transmitted over an interface (such as an X2-AP interface) between the two base stations. The interface may support information elements that convey a base station identifier, a timestamp indicating when the measurement of the timing offset was obtained, the timing offset measurement, and, in some embodiments, information indicating the location of the base station. The first base station may use the first and second timing offsets, as well as location information (if provided), to generate an improved estimate of the timing offset, as discussed herein.

In embodiments of the method 400 that determine timing adjustments using timing reference signals transmitted among more than two base stations, the timing offsets may be provided to a common data processing location such as an MME or an e-SMLC. Information elements for interfaces (such as interfaces that operate according to LPPa) may be defined to allow the base stations to report information such as a base station identifier, a timestamp indicating when the measurement of a timing offset was obtained, and the timing offset information. The common data processing location may use the provided timing offsets to generate improved estimates of the timing offsets for one or more of the multiple base stations, as discussed herein. The common data processing location may then transmit the improved estimates of the timing offsets to the corresponding base stations. Information elements for interfaces (such as interfaces that operate according to LPPa) may be defined to allow the common data processing location to transmit the information indicating the timing offsets to the corresponding base stations. These information elements may include an identifier of the corresponding base station, a timestamp indicating when the improved estimate of the timing offset was determined, and the improved estimate of the timing offset.

Figure 5:
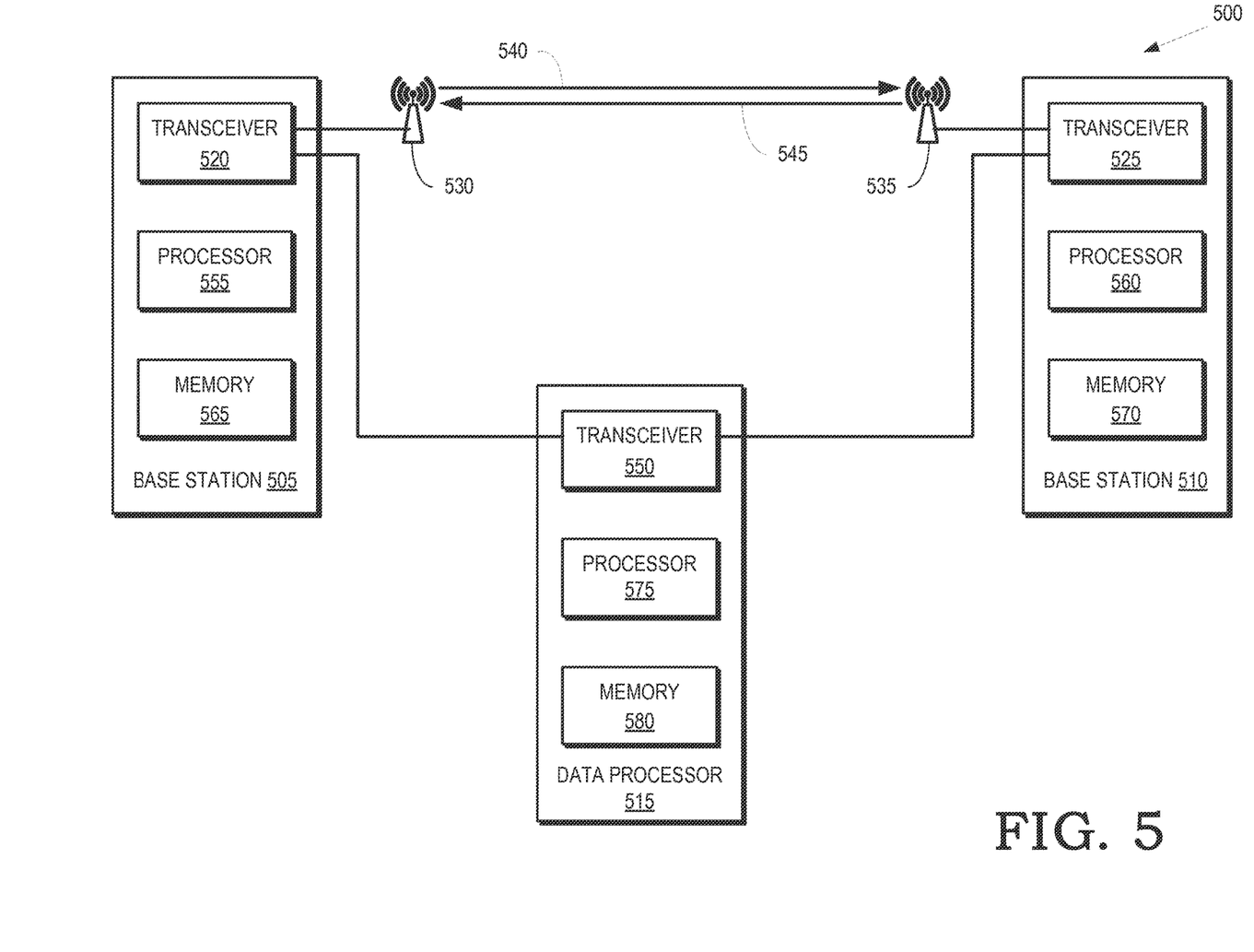
FIG. 5 is a block diagram of a wireless communication system according to some embodiments.

FIG. 5 is a block diagram of a wireless communication system 500 according to some embodiments. The wireless communication system 500 includes base stations 505, 510 and a common data processor 515, which may be used to implement some embodiments of the base stations 105, 110, the MME 145, or the e-SMLC 150 shown in FIG. 1. The base stations 505, 510 and the common data processor 515 may also be used to implement some embodiments of the base station 305, 310, 315, the MME 335, or the e-SMLC 340 shown in FIG. 3. Portions of the method 400 shown in FIG. 4 may also be implemented using the base stations 505, 510 and the common data processor 515.

The base stations 505, 510 include transceivers 520, 525 connected to antennas 530, 535 for transmitting and receiving signals such as the timing reference signals 540, 545.

The transceivers 520, 525 may also be used to transmit or receive information over interfaces with a transceiver 550 in the data processor 515. Some embodiments of the transceivers 520, 525 may further be used to transmit or receive information over an inter-base station interface (not shown) such as an X2-AP interface. The base stations 505, 510 also include processors 555, 560 and memories 565, 570. The processors 555, 560 may be used to execute instructions stored in the corresponding memories 565, 570 and to store information in the memories 565, 570 such as the results of the executed instructions. The data processor 515 also includes a processor 575 and a memory 578, which may be used to store information and instructions that may be executed by the processor 575. In some embodiments, the processors 550, 555, 575 and the memories 565, 570, 580 may be used to implement embodiments of the method 400 shown in FIG. 4.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   transmitting, from a first base station, a first timing reference signal;
   receiving, at the first base station, at least one second timing reference signal transmitted by at least one second base station;
   determining at least one first timing offset between the first base station and the at least one second base station based on the at least one second timing reference signal; and
   adjusting a timing associated with the first base station based on the at least one first timing offset and at least one second timing offset determined based on the first timing reference signal.

2. The method of claim 1, further comprising:
   determining a third timing offset associated with the first base station by averaging the at least one first timing offset and the at least one second timing offset or by filtering the at least one first timing offset and the at least one second timing offset, wherein adjusting the timing associated with the first base station comprises adjusting the timing using the third timing offset.

3. The method of claim 1, wherein determining the at least one first timing offset comprises determining the at least one first timing offset by comparing at least one reception time of the at least one second timing reference signal at the first base station to at least one transmission time of the at least one second timing reference signal from the at least one second base station.

4. The method of claim 3, wherein receiving the at least one second timing reference signal comprises receiving at least one timestamp indicating the at least one transmission time.

5. The method of claim 3, wherein receiving the at least one second timing reference signal comprises receiving at least one second timing reference signal transmitted from the at least one second base station at a predetermined transmission time.

6. The method of claim 1, further comprising:
   determining at least one propagation delay between the first base station and the at least one second base station; and
   subtracting the at least one propagation delay from the at least one first timing offset and the at least one second timing offset.

7. The method of claim 6, wherein determining the at least one propagation delay comprises determining the at least one propagation delay based on location information indicating locations of the first base station and the at least one second base station.

8. The method of claim 6, wherein determining the at least one propagation delay comprises determining the at least one propagation delay by comparing the at least one first timing offset and the at least one second timing offset.

9. The method of claim 6, wherein determining the at least one propagation delay comprises determining the at least one propagation delay based on at least one round trip delay between the first base station and the at least one second base station.

10. A first base station, comprising:
a transceiver to transmit a first timing reference signal and receive at least one second timing reference signal transmitted by at least one second base station; and
a processor to:
determine at least one first timing offset between the first base station and the at least one second base station based on the at least one second timing reference signal; and
adjust a timing associated with the first base station based on the at least one first timing offset and at least one second timing offset determined based on the first timing reference signal.

11. The first base station of claim 10, wherein the processor is to determine a third timing offset associated with the first base station by averaging the at least one first timing offset and the at least one second timing offset or by filtering the at least one first timing offset and the at least one second timing offset, and wherein the processor is to adjust the timing associated with the first base station using the third timing offset.

12. The first base station of claim 10, wherein the processor is to compare at least one reception time of the at least one second timing reference signal at the first base station to at least one transmission time of the at least one second timing reference signal from the at least one second base station.

13. The first base station of claim 12, wherein the transceiver is to receive at least one timestamp indicating the at least one transmission time.

14. The first base station of claim 12, wherein the transceiver is to receive at least one second timing reference signal transmitted from the at least one second base station at a predetermined transmission time.

15. The first base station of claim 10, wherein the processor is to:
determine at least one propagation delay between the first base station and the at least one second base station; and
subtract the at least one propagation delay from the at least one first timing offset and the at least one second timing offset.

16. The first base station of claim 15, wherein the processor is to determine the at least one propagation delay based on location information indicating locations of the first base station and the at least one second base station.

17. The first base station of claim 15, wherein the processor is to determine the at least one propagation delay by comparing the at least one first timing offset and the at least one second timing offset.

18. The first base station of claim 15, wherein the processor is to determine the at least one propagation delay based on at least one round trip delay between the first base station and the at least one second base station.

19. An apparatus, comprising:
a transceiver to receive at least two timing offsets determined by at least two base stations based on timing reference signals exchanged by the at least two base stations; and
a processor to determine a timing adjustment associated with the at least two base stations based on the at least two timing offsets.

20. The apparatus of claim 19, wherein the transceiver is to transmit the timing adjustment to the at least two base stations.

* * * * *